April 30, 1935.  J. C. LEONARD  1,999,466
PISTON RING
Filed April 25, 1934   2 Sheets-Sheet 1
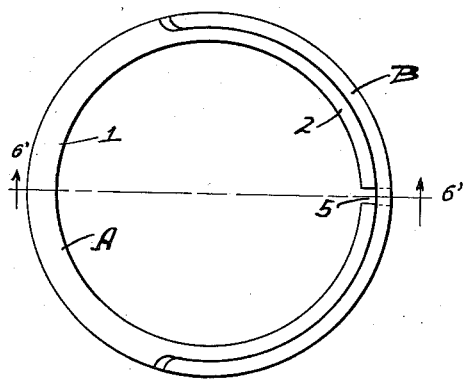
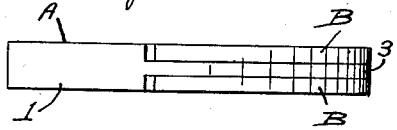
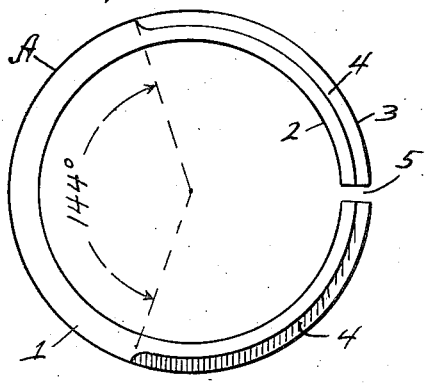
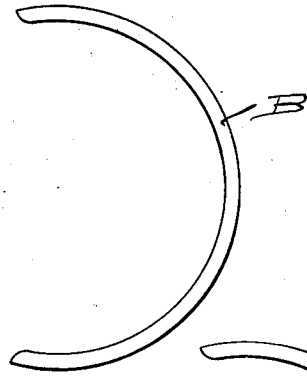
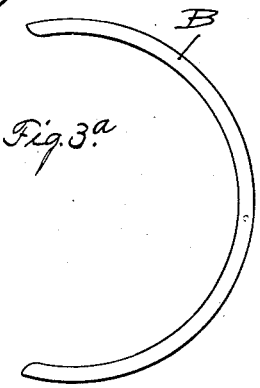
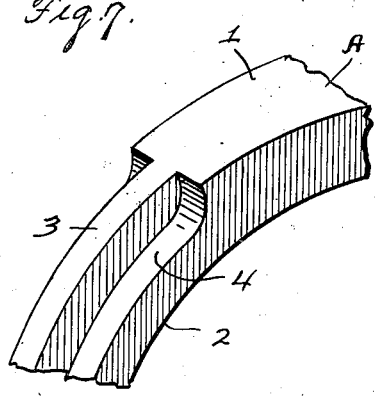
Inventor-
John C. Leonard April 30, 1935.  J. C. LEONARD  1,999,466
PISTON RING
Filed April 25, 1934   2 Sheets-Sheet 2

Inventor—
John C. Leonard

Patented Apr. 30, 1935

1,999,466

UNITED STATES PATENT OFFICE 1,999,466

PISTON RING

John C. Leonard, Oakland, Calif.

Application April 25, 1934, Serial No. 722,293

8 Claims. (Cl. 309—29)

My invention relates to improvements in piston rings of the class generally used on the pistons of internal combustion motors, steam engines, pumps, compressors, and the like, although also useful for other purposes; and one of the objects of the invention is the provision of a piston ring that will cure certain and obvious imperfections inherent in the piston rings at present in common use;

A further object is the provision of a piston ring that is quick and effective in expansion as well as in contraction to meet the requirements of the present day high-speed and high-compression motors;

A still further object is to provide a ring having like upper and lower surfaces whereby it may be readily reversed relative to the piston;

A still further object is the provision of a master ring members cooperable with a pair of identical complemental ring members, the latter being applicable by springing and slipping them into their respective rabbets formed in the master ring member after the latter's installation on the piston.

I obtain the above-mentioned, and other objects and purposes that will become apparent as the description proceds, by providing a master ring member embodying a major ring portion T-shaped in cross section whereby is formed a central rib and a pair of rabbets one on each side of said rib, and a minor ring portion substantially rectangular in cross section; the said rabbets being provided with a pair of coacting complemental ring members of like design.

In the accompanying drawings—

Figure 1 is a plan view of the present improved piston ring, assembled;

Figure 2 is a plan view of the master ring member;

Figures 3 and 3a are plan views of the complemental ring members;

Figure 4 is an edge view of the complete ring;

Figure 5 is an edge view of the master ring member;

Figure 6 is a sectional view on line 6'—6' of Fig. 1;

Figure 7 is an enlarged view in perspective of a portion of the master ring member;

Figure 8:
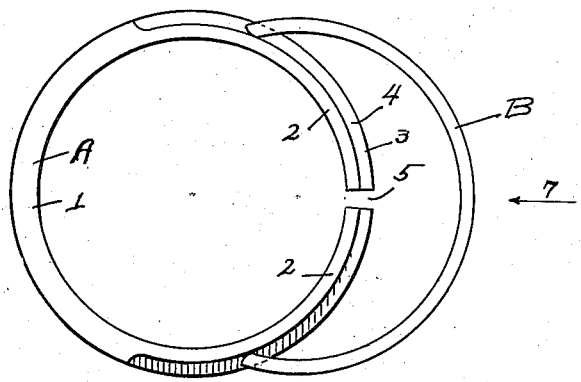
Figure 9:
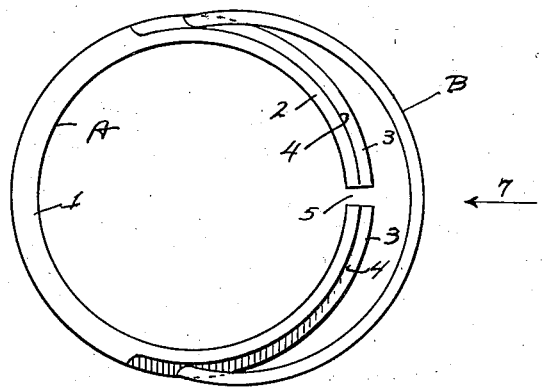

Figure 8 is a plan view of the master ring element and one of the complemental ring member, the latter in its initial position for application to the master ring member; and Figure 9 is a plan view of the master ring member and one of the complemental ring members, the latter being expanded diametrically by being forced, against the resistance of its own tension, into place over diametrically opposed portions of the master ring member, in the direction indicated by the arrow 7.

Referring to the drawings in detail, throughout which like reference characters designate like parts:

The letter A designates the master ring member, which is preferably formed of cast iron and embodies a minor section 1 rectangular in cross section and a major section 2 T-shaped in cross section whereby is formed an outwardly projecting rib 3 and a pair of like rabbets 4 on opposed sides of said rib.

The minor section 1 comprises approximately 144 degrees of the circumference of the master ring member, although the proportion of said section relative to that of the major portion or section 2, may be varied to suit conditions met with in the various motor designs.

A gap 5, severing the rim at the mid portion of section 2, permits of necessary expansion and contraction of the master ring member.

Two like complemental ring members B, which are preferably formed of steel wire of relatively dense material than the material comprising the cast iron master ring element A, are disposed in the rabbets 4 and preferably spring-press with sufficient pressure against the convex surface of the master ring member to be normally carried thereby.

In the application of my present improved piston ring to the groove of a piston, the master ring member A is first applied, which may be done in the usual manner of applying rings to motor pistons, after which application of the master ring member, the two complemental ring members B are applied, each, separately, by inserting its free ends in one of the rabbets 4, as shown in Fig. 8, and then pushing it forward in the rabbet between the rib 3 and the wall of the cylinder groove (not shown), in the direction indicated by the arrow 7, causing it to expand resiliently resistingly into the position shown in Fig. 9, and thence moving it further forward in the same direction, while diametrically contracting, until it slips into its normal position in the rabbet as best shown in Figs. 1 and 4.

The inner line curvature of the complemental ring members B is intended to be slightly more acute than the convex surface of the rabbet in which it is adapted to seat, thereby causing it, when so seated, to bear and bind against said convex surface with sufficient force to prevent its improper shifting, or accidental removal from the rabbet.

The master ring member A, being slightly larger of diameter than the cylinder in which the piston to which said member is installed reciprocates, it is necessarily compressed diametrically (the gap 5 permitting such compression) when the piston on which it is installed is disposed in the cylinder, and, therefore, when the piston is thus disposed in the cylinder, the normal tendency of the master ring member is to expand and to press against the cylinder walls, and the said master ring member having greater cross sectional dimensions than the complemental ring members B, as well as being formed of denser and harder material than the material forming the latter, it likewise has greater expansive force, causing it to overcome any contractile resistance the complemental ring members may exert thereagainst, and to cause said complemental ring members to expand therewith to properly press against the cylinder wall notwithstanding their normal tendency to contract diametrically, whereby said complemental ring members are caused to cooperate with the master ring member in forming a proper seal between the wall of the cylinder and the piston.

I claim:

1. In a piston ring of the character described, a master ring member having a portion substantially rectangular in cross section and having another portion T-shaped in cross section, said first named portion comprising an arc of a circle of between 135 and 180 degrees in extent.

2. In a piston ring of the character described, a master ring member having a portion substantially rectangular in cross section and having another portion T-shaped in cross section, and a pair of complemental ring members disposed in bearing association with said last named portion, said complemental ring members being substantially crescent shaped.

3. In a piston ring of the character described, a master ring member having a minor portion substantially rectangular in cross section and having a major portion T-shaped in cross section, and a pair of crescent-shaped complemental ring members disposed in association with said T-shaped portion, whereby the latter portion is made substantially rectangular in cross section.

4. In a piston ring of the character described, a master ring member having a minor portion substantially rectangular in cross section and having a major portion T-shaped in cross section, and a pair of coacting crescent-shaped complemental ring members in association with said major portion, the space between the inner surface of each of said complemental ring members, adjacent the free ends thereof, being normally less than the maximum diameter of said master ring member.

5. In a piston ring of the character described, a master ring member embodying a minor portion substantially rectangular in cross section, and a major portion T-shaped in cross section whereby is formed an outwardly projecting rib and a rabbet on each side of said rib, and a pair of identical crescent-shaped complemental ring members disposed in said rabbets, the free end portions of said complemental ring members spring-pressing against the convex walls of said rabbets whereby said complemental ring members are held in bearing engagement with opposed portions of said master ring member.

6. In a piston ring of the character described, a master ring member embodying a minor portion substantially rectangular in cross section and a major portion substantially T-shaped in cross section thereby providing an outwardly projecting rib and a rabbet on each side of said rib, and a complemental ring member disposed in each of said rabbets, said complemental ring members comprising, each, an arc of a circle between 200 and 230 degrees in extent.

7. In a piston ring, a master ring member comprising a portion substantially rectangular in cross section, and a portion substantially T-shaped in cross section, said T-shaped portion providing an outwardly projecting rib and a rabbet on each side of said rib, and a pair of complemental ring members disposed in said rabbets, the free ends of said complemental ring members being operatively engageable with said rectangular portion for limiting certain longitudinal movement of said complemental ring members in the plane of their curvature relative to said master ring member.

8. In a piston ring of the character described, a master ring member embodying a minor portion substantially rectangular in cross section and a major portion substantially T-shaped in cross section, said T-shaped portion providing an outwardly projecting rib and a rabbet on each side thereof, and a complemental ring member disposed in each of said rabbets, said complemental ring members being relatively movable in the plane of their curvature, the free ends of said complemental ring members being adapted to engage said rectangular portion for limiting certain longitudinal movement of said complemental ring members in either direction about the axis of said master ring member relative to the latter.

JOHN C. LEONARD.